G. P. FULLER.
NUT-LOCK.

No. 173,936. Patented Feb. 22, 1876.

Witnesses
Thomas G. Dewley.
Geo. C. Hetzel

Inventor
George P. Fuller
Stephen Ustick, attorney.

UNITED STATES PATENT OFFICE.

GEORGE P. FULLER, OF WELLSVILLE, NEW YORK.

IMPROVEMENT IN NUT-LOCKS.

Specification forming part of Letters Patent No. 173,936, dated February 22, 1876; application filed November 24, 1874.

*To all whom it may concern:*

Be it known that I, GEORGE P. FULLER, of Wellsville, in the county of Allegany and State of New York, have invented an Improvement in Nut-Locks for Railroad-Rails, of which the following is a specification:

My invention relates to the combination of a key-rod, having beveled edges, with all the nuts of a joint, the rod being passed through dovetail-slots in the outer sides of the nuts, and bent at the ends, or otherwise secured in its longituninal position, to prevent its being moved by frequent jars. When the nuts are not thick enough to admit of forming the slots, and still have sufficient thickness for the screw-threads, separate nuts provided with the slots are used for the locking operation.

Figure 1:
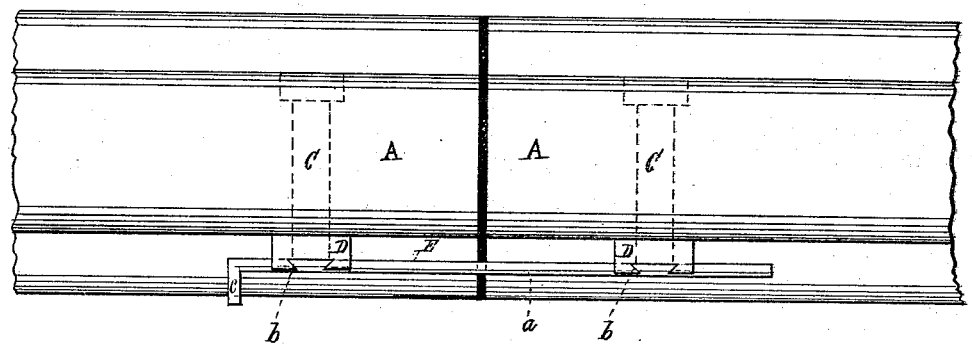
Figure 2:
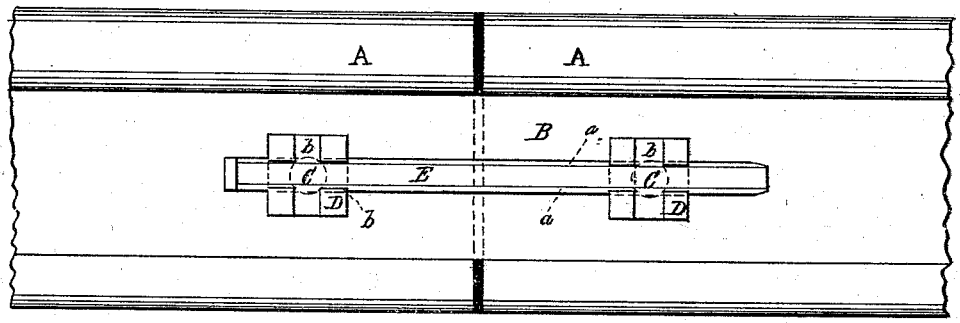
Figure 3:
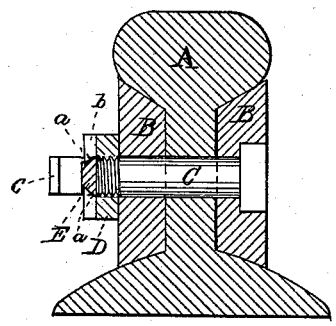

In the accompanying drawings, Figure 1 is a plan view of the contiguous ends of the two rails A A, with my improvement attached. Fig. 2 is a side elevation of the same. Fig. 3 is a cross-section at the line $x\ x$ of Fig. 1.

Like letters of reference in all the figures indicate the same parts.

A A are the contiguous ends of two rails. B B are the fish-plates; C C, screw-bolts, and D D nuts for clamping the fish-plates upon the rails. E is a key-rod, which is flat on its inner side, and has beveled edges $a\ a$ throughout its whole length. The nuts D have dovetail-slots $b\ b\ b\ b$, which run radially from the bolt-hole to receive the rod E, which is passed through two of the slots of each nut when brought in line, as seen in Fig. 2. The nuts may have any even number of slots, so as to have two in line for the connection of the key. The object in having a large number is to provide for a slight change in the position of the nuts in accommodation to screwing them up to just the proper degree of pressure upon the fish-plates B. There are only two bolts, C, shown in the drawing, yet it will appear that any number may be used. When the nuts D are not thick enough to admit of the dovetail slots $b$ outside of the screw-threads, additional nuts having these slots may be used. The rear end of the key-rod E is headed by a bend, $c$, or otherwise, to prevent its being driven too far, and its forward end, which is beveled and made thin at its point for its easy passage through the slots $b$, may be slightly bent to prevent the rod being moved back by frequent jars caused by the passage of trains over the rails. If desired, the forward end may be slit so as to be slightly opened after the connection of the rod with the nuts; or, the rod may be secured by a cold-shut ring, a spring-key, or other device.

I claim as my invention—

The nuts D, having dovetail slots $b$, in combination with the rod E, having beveled edges for locking two or more nuts, substantially in the manner and for the purpose set forth.

GEORGE P. FULLER.

Witnesses:
GEO. H. BLACKMAN,
H. D. TREADWELL.